Dec. 22, 1925.　　　J. R. PEARSALL　　　1,566,504

CAMP STOVE

Filed June 16, 1922　　　2 Sheets-Sheet 1

INVENTOR
James R Pearsall
BY
his ATTORNEYS

Dec. 22, 1925.  J. R. PEARSALL  1,566,504
CAMP STOVE
Filed June 16, 1922  2 Sheets-Sheet 2

INVENTOR.
James R. Pearsall
BY
ATTORNEYS.

Patented Dec. 22, 1925.

1,566,504

UNITED STATES PATENT OFFICE.

JAMES R. PEARSALL, OF ROCHESTER, NEW YORK.

CAMP STOVE.

Application filed June 16, 1922. Serial No. 568,741.

*To all whom it may concern:*

Be it known that I, JAMES R. PEARSALL, a citizen of the United States, and resident of Rochester, in the county of Monroe and State of New York, have invented certain new and useful Improvements in Camp Stoves, of which the following is a specification.

The present invention relates to camp stoves, and an object thereof is to provide an inexpensive structure which may be compactly folded in a small space. Another object of the invention is to provide a camp stove having a fire basket support beneath a food supporting grill and adjustable toward and from said grill. Still another object of the invention is to provide a food supporting frame which will be of strong and durable construction, while permitting the ready cleaning of the same. Still another object of the invention is to provide a camp stove in which the fire basket is adjustably suspended from the food supporting frame and guards are foldably suspended from the frame to confine the heat between the fire basket and the food supporting frame.

To these and other ends, the invention consists of certain parts and combinations of parts, all of which will be hereinafter described: the novel features being pointed out in the appended claim.

In the illustrated embodiment of the invention there is employed a food supporting frame comprising a rectangular frame piece 1 formed of angle iron to provide an inwardly extending flange 1ª on which the food supporting grill 2 is loosely supported, being confined on said flange by the flange of the angle iron projecting upwardly about the flange 1ª. This food supporting frame is preferably supporting by four legs 3 pivoted to the outer side of the frame 1 at 4 and adapted to swing, when folded, in parallel relation with said frame. Stops 5 on the outer side of the frame 1 are engaged by the legs 3 when the legs are in supporting positions to hold said legs in such supporting positions.

Figures 4, 5:
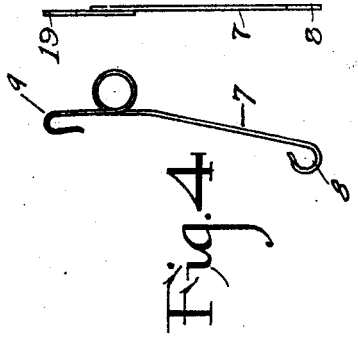
Fig. 4 and Fig. 5 are side and front detail views of the suspending means for the fire basket.
Figure 3:
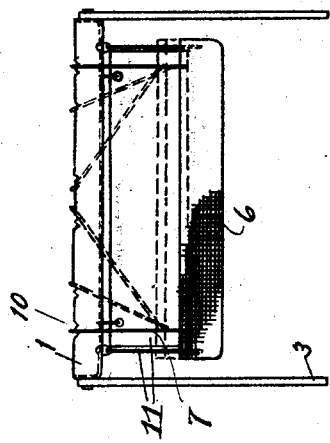
Fig. 3 is an end of the stove.
Figure 1:
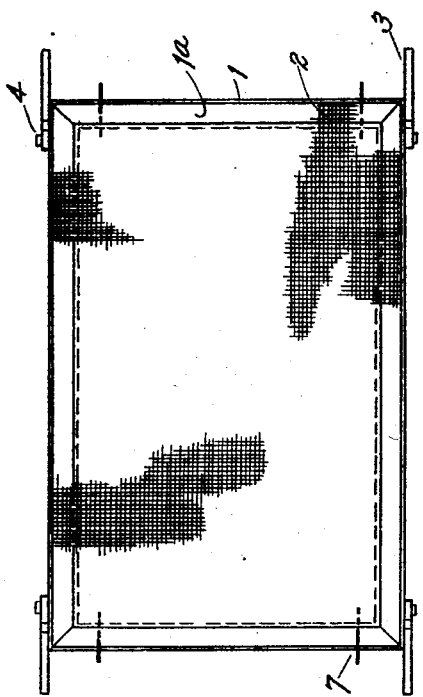
Fig. 1 is a plan view of a camp stove constructed in accordance with this invention, the food supporting grill being shown in fragments.
Figure 2:
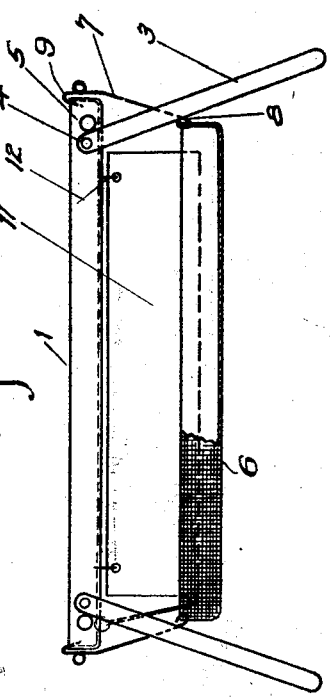
Fig. 2 is a side view of the camp stove.
Figure 6:
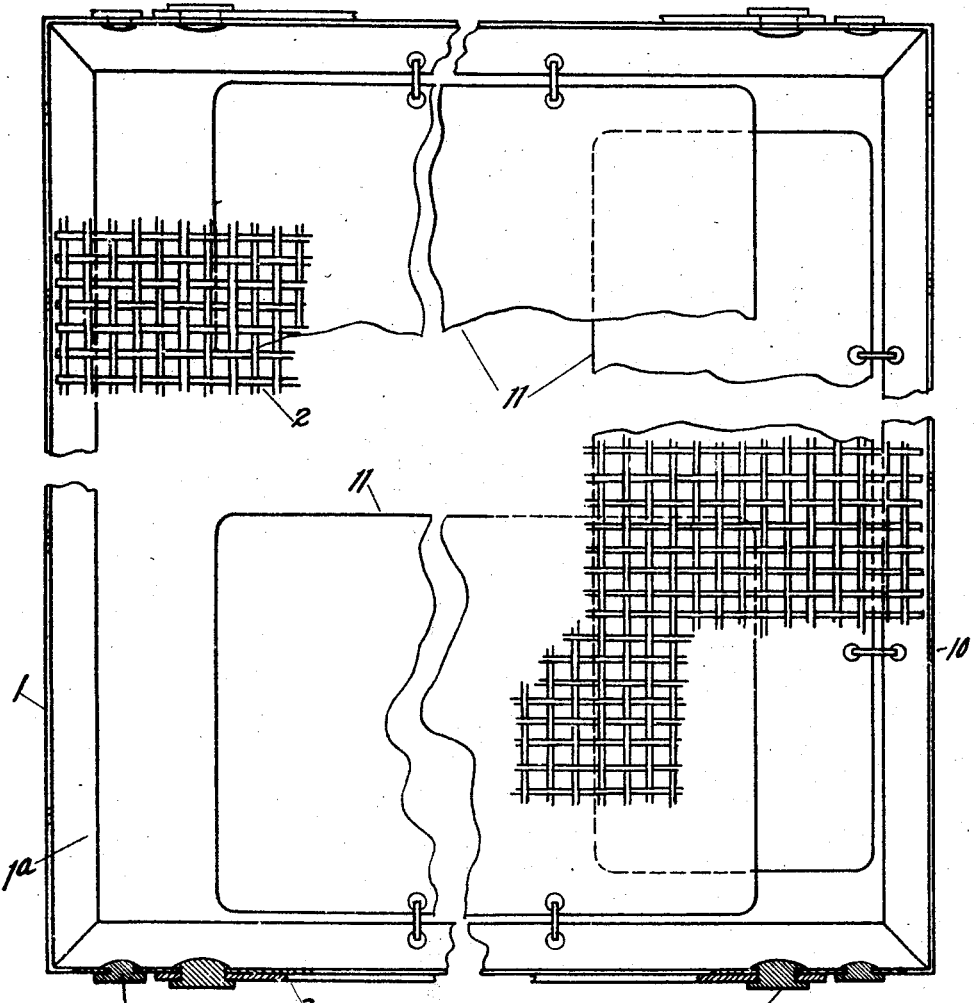
Fig. 6 is a fragmentary plan view of the food supporting frame with the fenders or guards in folded positions.
Figure 7:
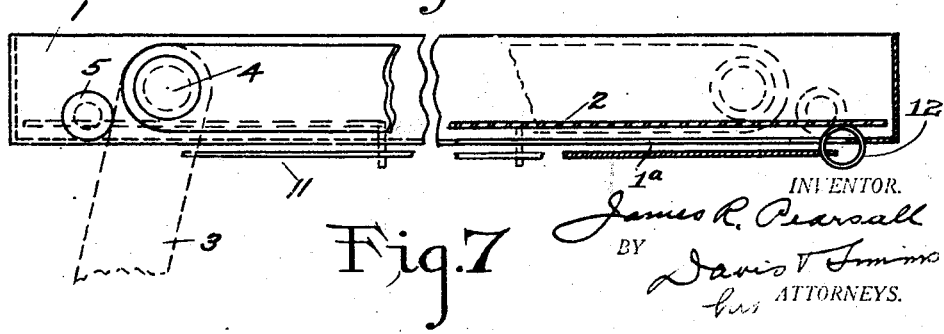
Fig. 7 is a fragmentary side view of the food supporting frame showing the parts in section, the fenders or guards being illustrated in folded condition.

Arranged below the food supporting frame is a fire basket 6 formed of reticulated material with its marginal edge turned upwardly. This basket is suspended by suspending devices preferably in the form of links 7, having eyes at 8 at their lower ends pivotally connected with opposite ends of the basket, the upper ends of said links having hooks 9 adapted to engage over the upwardly extending flanges of the frame 1. In order that the basket may be adjusted toward and from the food supporting frame, the links 7 have their hooked ends adjusted on the upwardly extending flanges, as indicated in Fig. 3 of the drawings. It is preferred to provide the opposite ends of the frame 1 with notches 10 in which the hooks may be engaged, in order to prevent the hooks from slipping on the flange of the frame 1, after the hooks have been adjusted. This permits the fire in the fire basket 6 to be moved toward and from the food supporting grill 2 due to the fact that if the suspending devices move inwardly toward the center of the frame, their effective lengths become shorter.

With the end in view of reducing the amount of heat which would escape between the basket and the food supporting frame, fenders or guards are provided. These fenders or guards, in this instance, are in the form of plates 11 suspended from the food supporting frame preferably through links 12 which pass through the guards 11 and the flange 1ª of the food supporting frame, and permit the guards to swing inwardly parallel with the plane of the food supporting frame when the stove is collapsed. When the camp stove is in condition for use, these guards or fenders close the space between the fire supporting basket on the three sides of the basket, thus permitting the introduction of fuel into the basket on the inner side of the latter.

From the foregoing it will be seen that there has been provided a camp stove of durable and inexpensive construction which may be folded into compact form. This stove embodies a food supporting frame having an inwardly projecting flange or rest on which the food supporting grill is removably supported. From the food supporting frame a fire basket is suspended preferably through means which permits the adjustment of the basket to and from the food supporting frame. Fenders or guards are foldably suspended from the food supporting frame to close the space between the latter and the fire basket.

What I claim as my invention and desire to secure by Letters Patent is:

A camp stove comprising a rectangular grill supporting frame, a grill supported on said frame, fenders hinged to the frame to swing inwardly in parallel relation thereto, legs pivoted to the sides of the frame on the outer sides of the fenders to swing into the plane of the frame, a fire basket of shallow construction, rectangular in form, and having a flat bottom, and means for suspending the fire basket from the rectangular grill supporting frame, said means being constructed to space the fire basket from the rectangular frame and to permit the fire basket to be brought into close proximity with the rectangular frame so that the entire stove may be compactly folded.

JAMES R. PEARSALL.